(12) United States Patent
Zalivaka et al.

(10) Patent No.: US 11,568,093 B2
(45) Date of Patent: Jan. 31, 2023

(54) DATA SCRAMBLERS WITH ENHANCED PHYSICAL SECURITY

(71) Applicant: SK hynix Inc., Icheon-si (KR)

(72) Inventors: Siarhei Zalivaka, Minsk (BY); Alexander Ivaniuk, Minsk (BY)

(73) Assignee: SK hynix Inc., Icheon-si (KR)

( * ) Notice: Subject to any disclaimer, the term of this patent is extended or adjusted under 35 U.S.C. 154(b) by 202 days.

(21) Appl. No.: 16/851,428

(22) Filed: Apr. 17, 2020

(65) Prior Publication Data

US 2021/0326490 A1    Oct. 21, 2021

(51) Int. Cl.
| | |
|---|---|
| *G06F 11/00* | (2006.01) |
| *G06F 21/79* | (2013.01) |
| *G06F 11/10* | (2006.01) |
| *H03M 13/15* | (2006.01) |
| *H04L 9/08* | (2006.01) |
| *H03M 13/29* | (2006.01) |
| *H04L 9/32* | (2006.01) |

(52) U.S. Cl.
CPC .......... *G06F 21/79* (2013.01); *G06F 11/1068* (2013.01); *H03M 13/152* (2013.01); *H03M 13/1515* (2013.01); *H03M 13/2906* (2013.01); *H04L 9/0869* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 9,026,882 | B2* | 5/2015 | Oshida | H03M 13/29 |
| | | | | 714/755 |
| 2012/0183135 | A1* | 7/2012 | Paral | G09C 1/00 |
| | | | | 380/44 |
| 2015/0026545 | A1* | 1/2015 | Yu | H04L 1/0042 |
| | | | | 714/780 |

(Continued)

OTHER PUBLICATIONS

S. Joshi, S. P. Mohanty and E. Kougianos, "Everything You Wanted to Know About PUFs," in IEEE Potentials, vol. 36, No. 6, pp. 38-46, Nov.-Dec. 2017, doi: 10.1109/MPOT.2015.2490261. (Year: 2017).*

(Continued)

*Primary Examiner* — Daniel F. McMahon
(74) *Attorney, Agent, or Firm* — Perkins Coie LLP

(57) ABSTRACT

Devices, systems and methods for improving reliability and security of a memory system are described. An example method includes receiving a seed value and a data stream, generating, based on the seed and using a physical unclonable function (PUF) generator, a PUF data pattern, generating, based on the seed, a pseudo-random data pattern, performing a first logic operation on the PUF data pattern and the data stream to generate a result of the first logic operation as a first data sequence, and performing a second logic operation on the pseudo-random data pattern and a second data sequence that is based on the first data sequence to generate a result of the second logic operation as a third data sequence for storage on the memory system, wherein the PUF generator is selected at least in-part based on one or more physical characteristics of the memory system.

17 Claims, 11 Drawing Sheets

(56) References Cited

U.S. PATENT DOCUMENTS

| | | | |
|---|---|---|---|
| 2015/0195088 A1* | 7/2015 | Rostami | H04L 9/3278 380/28 |
| 2018/0123808 A1* | 5/2018 | Hung | G09C 1/00 |
| 2018/0278418 A1* | 9/2018 | Chang | H04L 9/0891 |
| 2019/0324725 A1 | 10/2019 | Wang | |
| 2019/0342090 A1* | 11/2019 | Pisasale | H04L 9/0662 |
| 2019/0349208 A1* | 11/2019 | Merchan | H04L 9/3278 |
| 2020/0396092 A1* | 12/2020 | Cambou | H04L 9/3234 |

OTHER PUBLICATIONS

Z. Paral and S. Devadas, "Reliable and efficient PUF-based key generation using pattern matching," 2011 IEEE International Symposium on Hardware-Oriented Security and Trust, 2011, pp. 128-133, doi: 10.1109/HST.2011.5955010. (Year: 2011).*

Cai, Y. et al., "Vulnerabilities in MLC NAND Flash Memory Programming: Experimental Analysis, Exploits, and Mitigation Techniques," in HPCA, 2017, 12 pages.

Maes, R. et al., "PUFKY: A Fully Functional PUF-Based Cryptographic Key Generator." Cryptographic Hardware and Embedded Systems—CHES 2012. Lecture Notes in Computer Science, vol. 7428. Springer, Berlin, Heidelberg. 18 pages.

Van Zandwijk, J.P., "A mathematical approach to NAND flash-memory descrambling and decoding", in Digital Investigation, 12, 2015, pp. 41-52.

Xilinx, "Artix-7 FPGAs Data Sheet: DC and AC Switching Characteristics", Xilinx, 2019 [Online]. Available: https://www.xilinx.com/support/documentation/data_sheets/ds181_Artix_7_Data_Sheet.pdf [Accessed: Dec. 27, 2019]. 64 pages.

Zalivaka, S.S. et al., "Design and implementation of high quality PUF for hardware-oriented cryptography," in Secure System Design and Trustable Computing, Springer International Publishing AG, Switzerland, pp. 39-81, Oct. 2015.

* cited by examiner

DATA SCRAMBLERS WITH ENHANCED PHYSICAL SECURITY

TECHNICAL FIELD

This patent document generally relates to memory devices, and more specifically, to enhancing security and reliability in memory devices.

BACKGROUND

Data integrity is an important feature for data storage and data transmission. Using data scramblers, which provide uniform data distribution, to improve reliability is recommended for various types of data storage devices including NAND flash memory devices.

Solid-state drives (SSDs) use multi-level NAND flash devices for persistent storage. However, multi-level NAND flash devices can be inherently unreliable and generally need to use scramblers, which rely on a pseudo-random number generator (PRNG) to allow the uniform distribution of data. There is a demand for increasingly secure PRNGs and scramblers that can provide data protection with higher reliability.

SUMMARY

Embodiments of the disclosed technology relate to improving integrity, reliability and security of data stored on storage devices. These and other features and benefits are achieved at least in-part by using data scrambling in NAND flash devices for data randomization in order to avoid reliability degradation in memory cells. In addition, the scrambling operation is configured to be resilient against cryptographic attacks, which typically lead to data and memory cell corruption.

In an example aspect, a method for improving the reliability and security of a memory system is described. The method includes receiving a seed value and a data stream, generating, based on the seed and using a physical unclonable function (PUF) generator, a PUF data pattern, generating, based on the seed, a pseudo-random data pattern, performing a first logic operation on the PUF data pattern and the data stream to generate a result of the first logic operation as a first data sequence, and performing a second logic operation on the pseudo-random data pattern and a second data sequence that is based on the first data sequence to generate a result of the second logic operation as a third data sequence for storage on the memory system, wherein the PUF generator is selected at least in-part based on one or more physical characteristics of the memory system and increases the reliability and security for storage on the memory system.

In another example aspect, a method for improving the reliability and security of a memory system is described. The method includes receiving a seed value, receiving a data stream read from the memory system, generating, based on the seed, a pseudo-random data pattern, performing a first logic operation on the data stream and the pseudo-random data pattern to generate a result of the first logic operation as a first data sequence, performing a first error correction decoding operation on the first data sequence to generate a second data sequence, generating, based on the seed and using a physical unclonable function (PUF) generator, a PUF data pattern, performing a second logic operation on the second data sequence and the PUF data pattern to generate a result of the second logic operation as a third data sequence, performing a second error correction decoding operation on the third data sequence to generate a fourth data sequence, and transmitting the fourth data sequence to a host, wherein the PUF generator is selected at least in-part based on one or more physical characteristics of the memory system and increases the reliability and security for storage on the memory system.

In yet another example aspect, a system for improving the reliability and security of a memory system is described. The system includes a physical unclonable function (PUF) generator to receive a seed value and output a PUF data pattern, a first logic circuit to receive a data stream, perform a first logic operation on the PUF data pattern and the data stream, and output a result of the first logic operation as a first data sequence, a pseudo-random number generator (PRNG) to receive the seed and generate a pseudo-random data pattern, and a second logic circuit to perform a second logic operation on the pseudo-random data pattern and a second data sequence that is based on the first data sequence, and output a result of the second logic operation as a third data sequence for storage on the memory system, wherein the PUF generator is selected at least in-part based on one or more physical characteristics of the memory system and increases the reliability and security for storage on the memory system.

In yet another example aspect, the above-described method may be implemented by a video encoder apparatus or a video decoder apparatus that comprises a processor.

In yet another example aspect, these methods may be embodied in the form of processor-executable instructions and stored on a computer-readable program medium.

The subject matter described in this patent document can be implemented in specific ways that provide one or more of the following features.

DETAILED DESCRIPTION

Solid state drives (SSDs) are a new generation of storage device used in computers. SSDs replace traditional mechanical hard disks by using flash-based memory, which is significantly faster. SSDs speed up computers significantly due to their low read-access times and fast throughputs. SSDs typically use LDPC codes to correct any bit-errors in pages read from NAND media, and further use scramblers to avoid worst-case patterns that cannot be corrected by the LDPC codes. Data scrambling for non-volatile memory such as NAND memories has become increasingly important in addressing system reliability issues.

FIGS. 1-6, 7A and 7B overview a non-volatile memory system (e.g., a flash-based memory, NAND flash) in which embodiments of the disclosed technology may be implemented.

Figure 1:
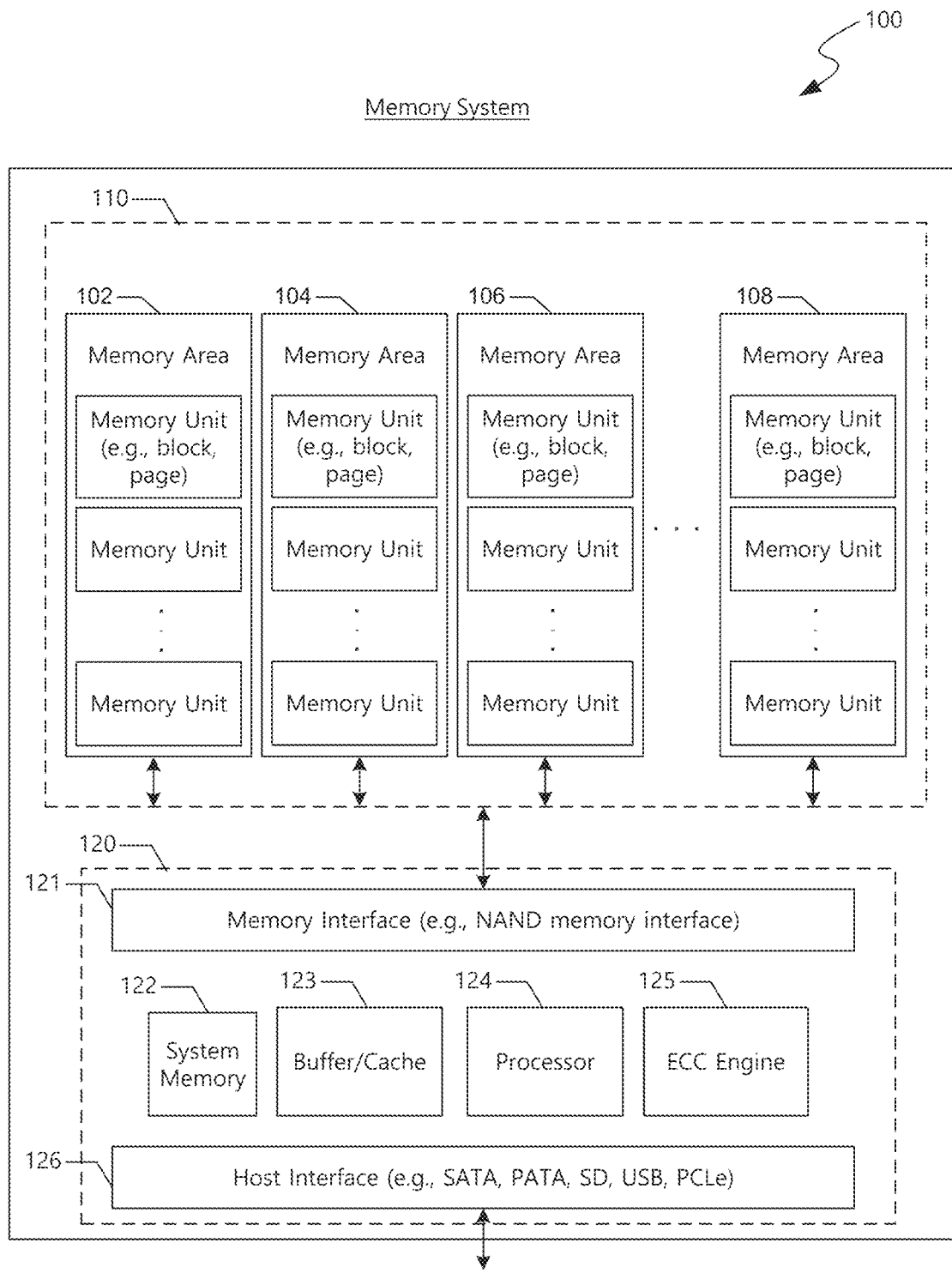
FIG. 1 illustrates an example of a memory system.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
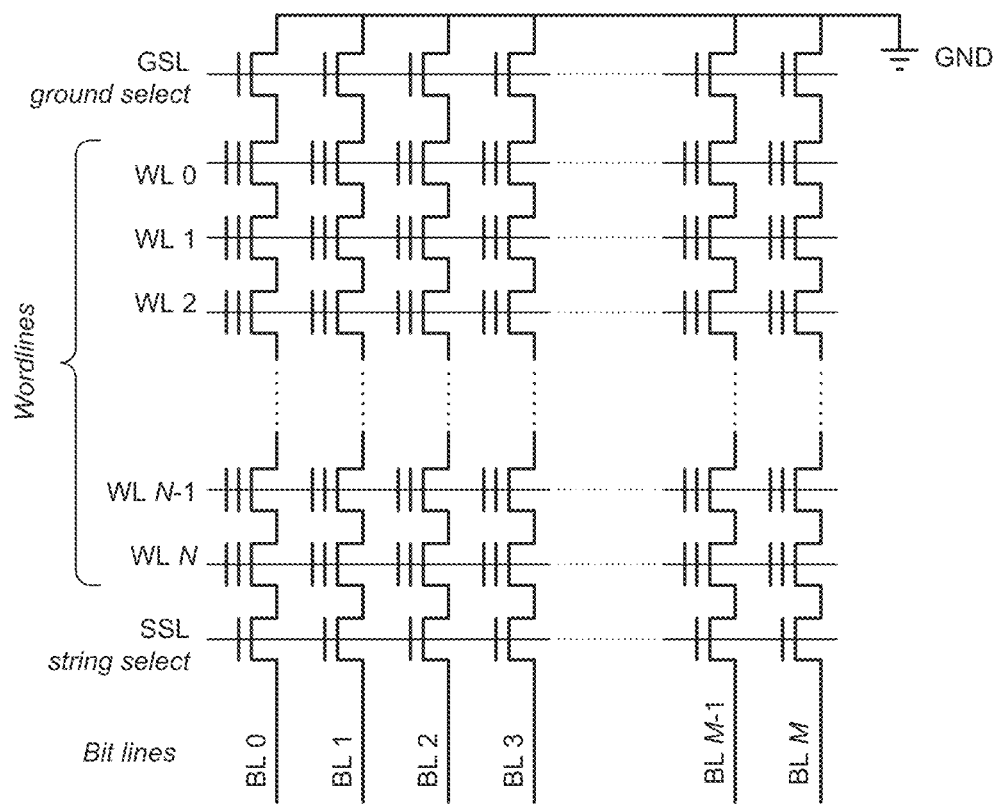
FIG. 2 is an illustration of an example non-volatile memory device.

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
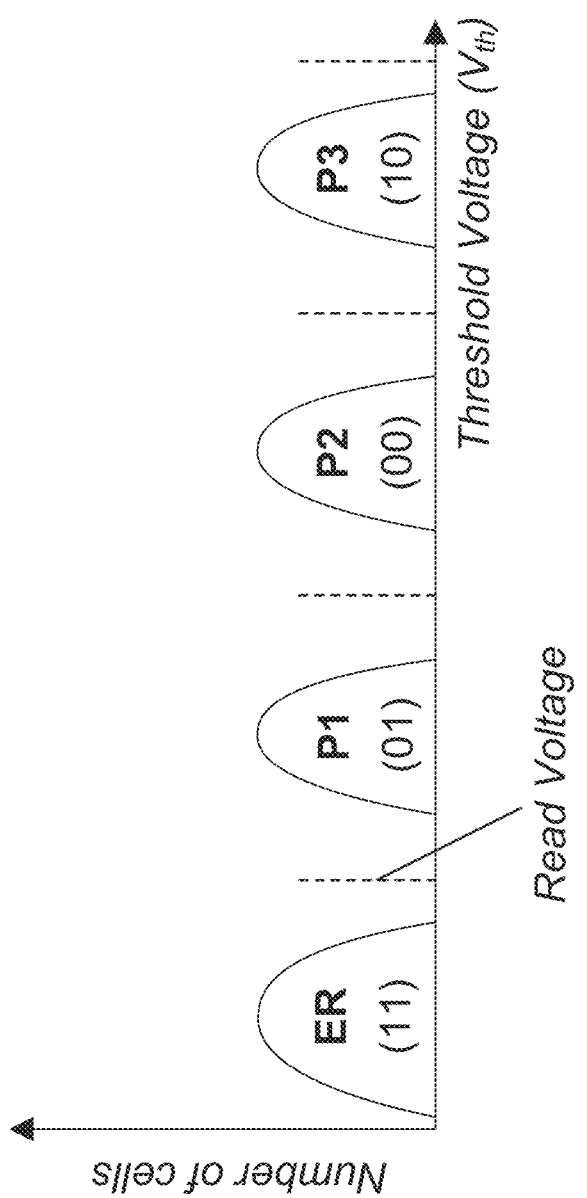
FIG. 3 is an example diagram illustrating the cell voltage level distribution ($V_{th}$) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a stair case program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECC).

Figure 4:
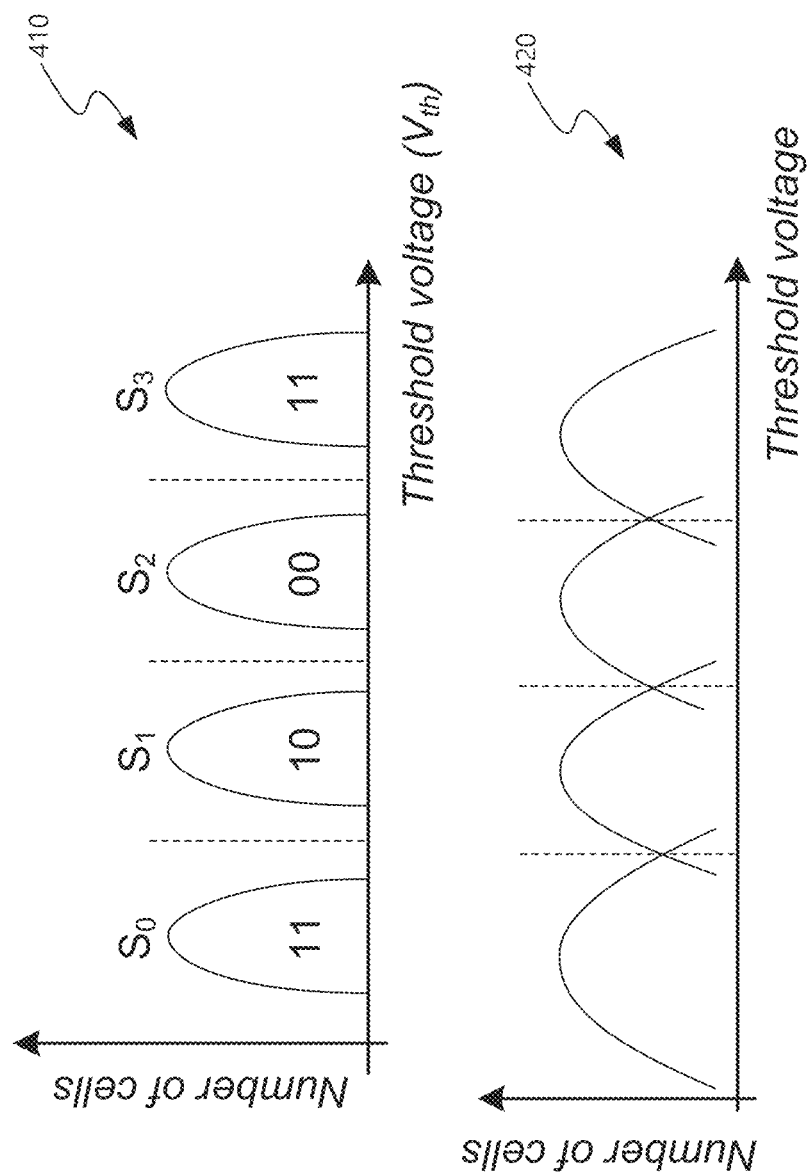
FIG. 4 is another example diagram illustrating the cell voltage level distribution ($V_{th}$) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
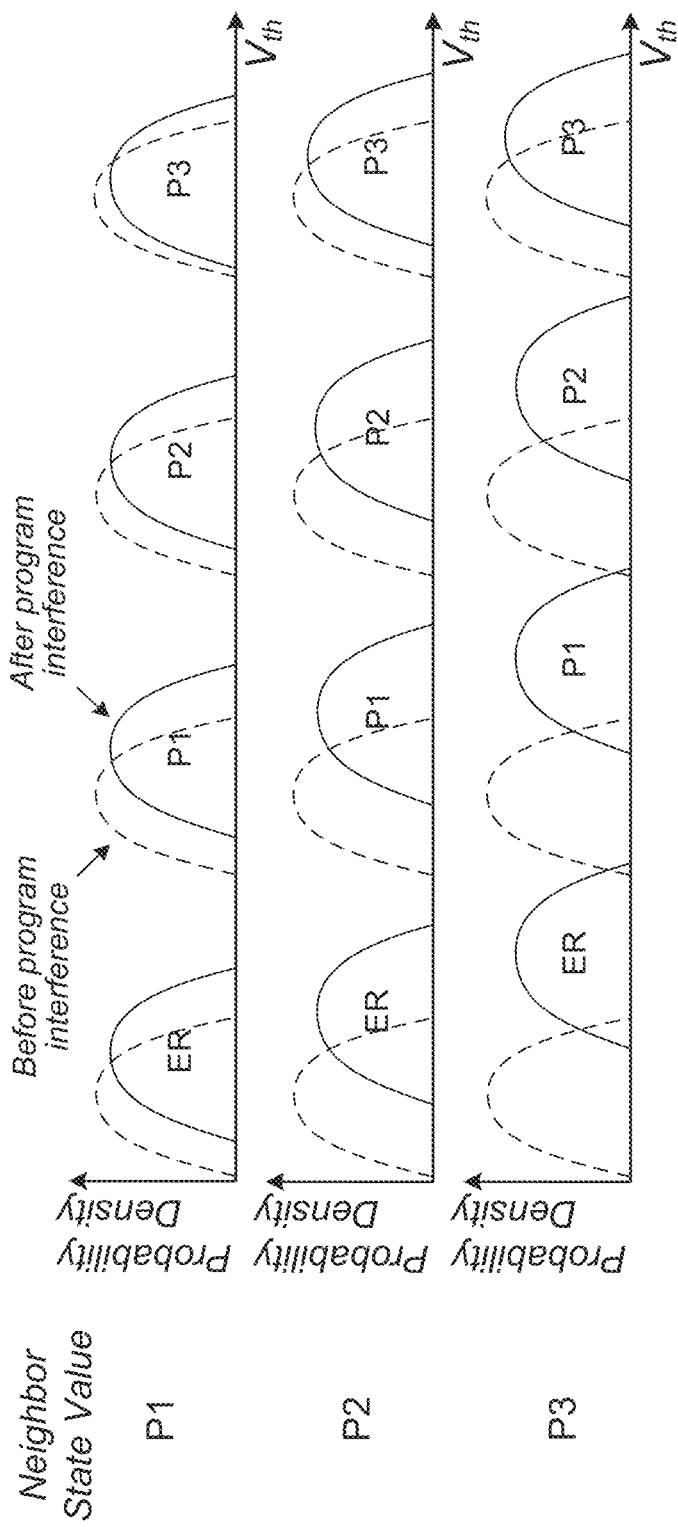
FIG. 5 is an example diagram illustrating the cell voltage level distribution ($V_{th}$) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
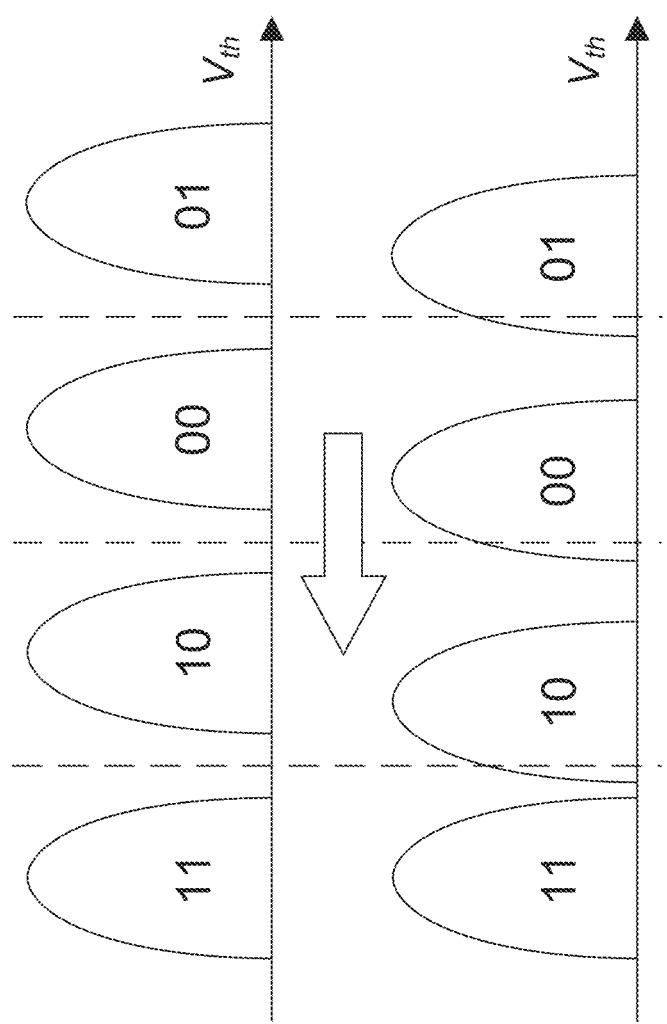
FIG. 6 is an example diagram illustrating the cell voltage level distribution ($V_{th}$) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

Figure 7A:
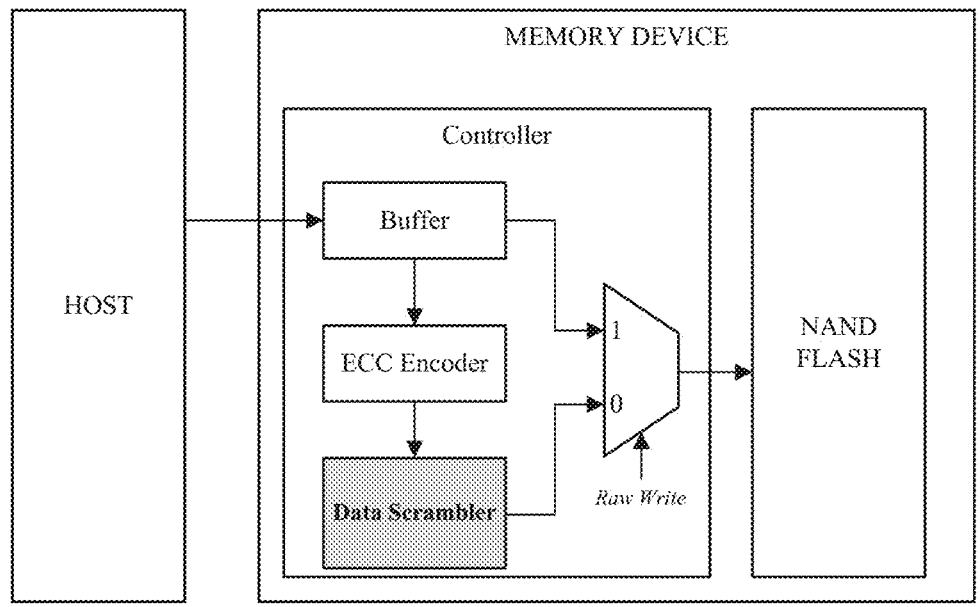
FIGS. 7A and 7B illustrate examples of NAND flash memory device.
Figure 7B:
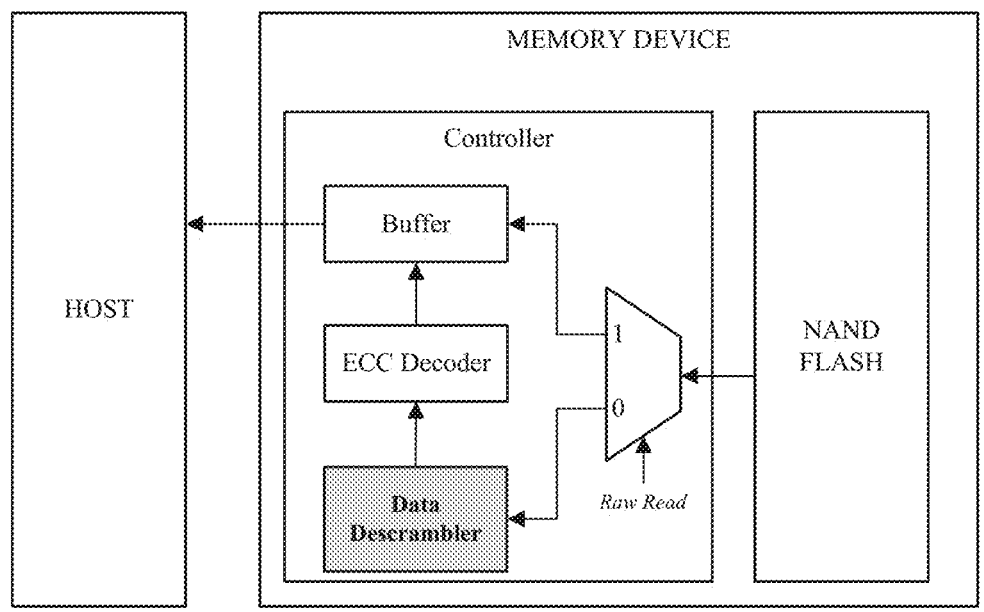

FIGS. 7A and 7B illustrate another example of a NAND flash memory device, which typically includes a host, a controller and a NAND memory cells array. In an example, the host communicates with the device using high-speed interface and generates a workload for the controller. The data from host is stored in buffer (usually dynamic RAM (DRAM)) and then encoded by error correction codes. The encoding is required as basic reliability of NAND memory cells is quite low and this kind of memory introduces multiple errors during read and write operations.

One of the important blocks in NAND flash memory devices (e.g., as described in FIGS. 1-6, 7A and 7B) is a hardware implementation of a scrambler (also referred to as a randomizer) which improves reliability of the memory cells. Embodiments of the disclosed technology include methods, systems and devices that increase the security of data scramblers, thereby improving the reliability and security of memory systems in general, and non-volatile memory devices as an example.

Figure 8:
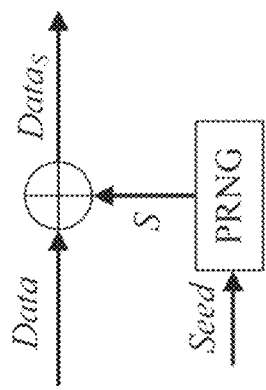
FIG. 8 illustrates an example of a data scrambler.

FIG. 8 illustrates an example of a data scrambler. As illustrated therein, a data scrambler typically includes a pseudo-random number generator (PRNG) block, which is usually seeded by some value (e.g., a logical block address (LBA) or a physical page number (PPN)). This block generates a uniformly distributed sequence S which is XORed with Data sent from the host. As a result $Data_S$=Data XOR S is programmed to the NAND memory cells.

However, this traditional implementation is vulnerable to an attacker being able to degrade the reliability of the NAND memory cells. Since the scrambler processes the data using a pseudorandom number sequence, the attacker can collect enough outputs ($Data_S$) and restore the configuration data of the PRNG block (e.g., polynomial coefficients). This may enable the attacker to build a mathematical model of the scrambler and obtain output values for any input data pattern. The feasibility of the attack is predicated on the attacker having access to the NAND flash memory cells using raw read/write operations, and also assuming an untrusted communication channel between the host and the memory device.

In an example, if an attacker wants to program some particular data pattern ($D_P$) to NAND, the attacker processes this sequence using the mathematical model to obtain $D_x$= ($D_P$ XOR S) and sends the output $D_x$ to the device. As a result, $$Data_S = D \text{ XOR } S = (D_P \text{ XOR } S) \text{ XOR } S = D_P.$$

will be programmed to the memory device. Thus, the attacker is able to get any data patterns (worst case data patterns, e.g., all zeros) in order to degrade NAND reliability. Since many memory devices are manufactured with the same circuit design, the attacker can take advantage of using the same mathematical model of a scrambler (obtained from a single device) to degrade reliability of other devices.

In another example, the reliability of the NAND memory cells can be also degraded by programming same data pattern. For example, if same data pattern (Data) is sent from the host to the same LBA or PPN (the same seed value for PRNG) multiple times, it is transformed to the same data pattern on NAND ($Data_S$). As a result, memory cells are programmed with the same value and this leads to increasing of their Bit Error Rate (BER).

Embodiments of the disclosed technology mitigate the vulnerabilities of traditional scramblers by using a Physical Unclonable Function (PUF) as an additional data processing operation before scrambling that provides, amongst other feature and benefits, the following:

(1) A significant decrease in vulnerability with regard to building a mathematical model of a scrambler;

(2) Encryption of the data without using hardware-costly algorithms (e.g., Advanced Encryption Standard (AES)), which are typically not used in mobile flash or Internet of Things (IoT) devices; and (3) An increase in the reliability of NAND by avoiding the programming of the same data pattern repeatedly.

A PUF can be represented as a mapping of external inputs (challenges) to the outputs (responses). This mapping is called challenge-response pairs (CRP) set, which is unique for each integrated circuit (IC) containing a PUF block even if the design and layout are the same. In some embodiments, the uniqueness of the PUF CRP set is due to intrinsic manufacturing process variations introduced during fabrication. Since physical properties of an IC may vary depending on temperature or voltage, some of the PUF response values are unstable. As a result, CRP set can be split into stable and unstable subsets and can be utilized for identification and random number generation, respectively. In other embodiments, the uniqueness of the PUF CRP set is based on different physical phenomena (e.g., delay values, threshold voltages, operating frequencies, image sensor noise patterns, etc.).

Embodiments of the disclosed technology use a PUF circuit for key generation and encryption, therein requiring the PUF responses to be stable. On the other hand, to provide a defense against same data pattern attack, the PUF should have some noise to make data patterns unpredictable for an attacker. Thus, in some embodiments, the scrambler is implemented with additional error correcting capability based on a NAND error correction code engine.

In some embodiments, a data scrambler is configured by adding a PUF circuit to the data path of a flash memory device. This provides enhanced security to the existing scrambler design as it encrypts the data using unique PUF-generated key. It also requires much smaller hardware overhead comparing to the classical encryption algorithms (e.g., AES). Since PUF adds unique signature to the data, it becomes much harder for an attacker to mathematically model scrambler and send worst case data patterns, which degrade the reliability of NAND memory cells. Furthermore, even if the attacker managed to know the configuration of a PRNG block for a single device, it does not give the attacker the advantage for the other devices as PUF responses are unique for every device.

Two example architectures for implementing the PUF include (1) a PUF implementation that remains noisy and that does not require hardware for stabilization. However, the NAND ECC engine has to be strengthened in order to provide correction capability for errors brought by both NAND memory cells and PUF response; and (2) an implementation that uses two separate ECC engines; a bigger (stronger) ECC engine for NAND errors and a smaller (weaker) ECC engine for correcting errors added to the data by the PUF.

Figure 9:
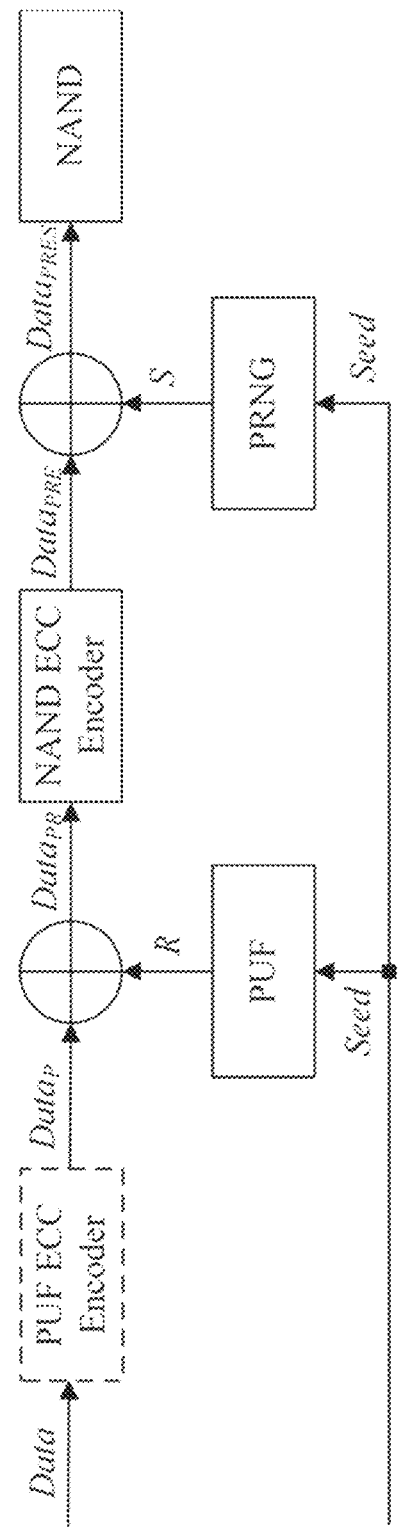
FIG. 9 illustrates an example write data path that includes a scrambling operation.

FIG. 9 illustrates an example write data path that includes a scrambling operation. As illustrated therein, the ECC encoder is located before the scrambler, and the PUF component is added to the data path in order to provide lightweight encryption for user data. In this example, the PUF component is seeded by the same value as the scrambler, and generates a signature R which is unique for every memory device even if it has completely same design. Since the PUF output R can be noisy, an optional small ECC engine (denoted as PUF ECC encoder) is added to the data path, and is configured to encode host Data and convert it into $Data_P$. The PUF output R is XORed with encoded $Data_P$, and encrypted $Data_{PR}$ is further processed by the NAND ECC encoder to generate the codeword $Data_{PRE}$. As illustrated in FIG. 9, the encoded and encrypted $Data_{PRE}$ is then scrambled by XORing with the PRNG generated value S, and the scrambled data $Data_{PRES}$ is programmed to the NAND. As noted earlier, the PUF ECC encoder is an optional block that is used to protect data from PUF errors without modifying the NAND ECC engine.

Figure 10:
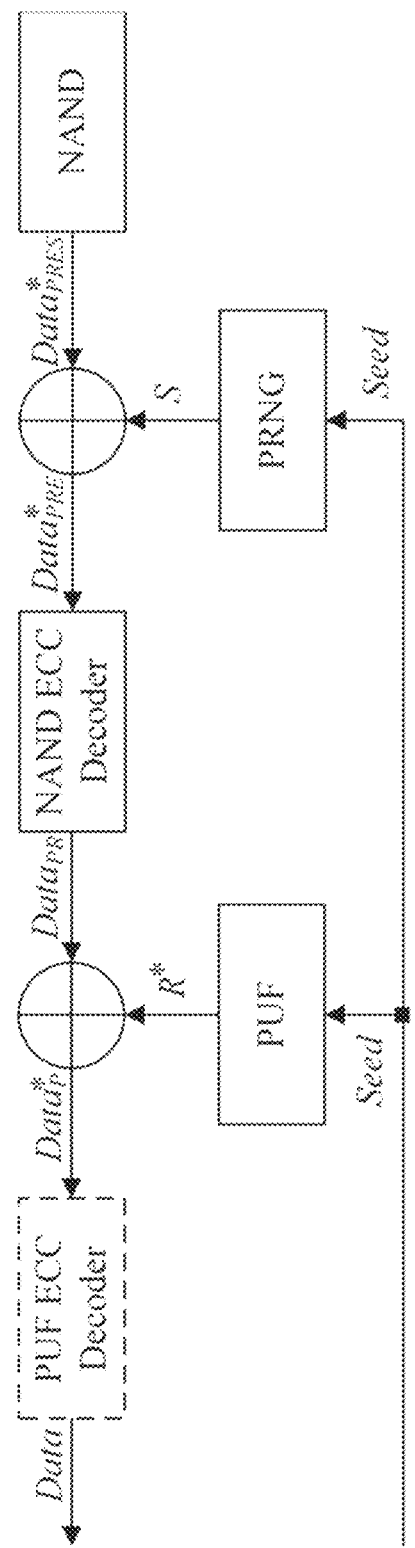
FIG. 10 illustrates an example read data path that includes a descrambling operation.

FIG. 10 illustrates an example read data path that includes a descrambling operation, which reverses the encoding and scrambling operation illustrated in FIG. 9. As illustrated in FIG. 10, scrambled data $Data_{PRES}$, which is typically not equal to $Data_{PRES}$ since NAND-based storage usually produces multiple errors during read operation, is read. The, $Data_{PRES}*$ is descrambled, using the value S generated by the PRNG, to generate $Data_{PRE}*$ (and assumes, without loss of generality, that the seed that was used at the encoder is also available at the decoder). The NAND ECC decoder corrects errors in $Data_{PRE}*$ to generate $Data_{PR}$. This is followed by decrypting $Data_{PR}$ to generate $Data_P*$, which will not be equal to $Data_P$ because the $R* \neq R$ value produced by the PUF component in the decoder is used in the decryption process. That is, the value $R*$ from the PUF block is noisy since it is not stable, and thus $Data_P*$ will be corrupted by PUF noise. Consequently, this data is sent to the host and is corrected by the PUF ECC decoder to generate Data.

In some embodiments, the PUF ECC decoder may be omitted, in which case the NAND ECC decoder is placed after XORing with the PUF response and is configured to correct errors from both the PUF noise and the NAND noise.

As described above, since the PUF component is susceptible to adding errors to the data in the decoding stage, the ECC capabilities should be enlarged. In some embodiments, this may be achieved using one or more implementations:
(1) enlarging the correction capabilities of the NAND ECC engine;
(2) correcting data after the PUF component using an additional ECC engine, i.e., the PUF ECC encoder illustrated in FIG. 9 and the PUF ECC decoder illustrated in FIG. 10, and/or
(3) enhancing reliability of the PUF component.

The first two implementations require additional hardware overhead for correcting unstable PUF outputs, but this overhead is typically smaller than utilizing cryptographic algorithms (e.g., AES) that are most robust and reliable. The instability of the PUF block output advantageously decreases the vulnerability to same pattern programming and a changing data pattern every write pattern.

In an example that demonstrates the efficacy of the disclosed technology, it is assumed that the NAND ECC engine can be implemented as a Bose-Chaudhuri-Hocquenghem (BCH) code, the PUF ECC engine as a Reed-Solomon code, and hardware overhead is estimated as FPGA look-up tables (LUTs) and flip-flops. It is further assumed that the host transmits 1023 bits of data and the PUF component generates a 1023-bit response. For this example:
the PUF component is noisy with a bit error rate (BER) of 0.01, i.e., the PUF block generates around 11 errors in a 1023-bit response;
the NAND produces a maximum of 70 errors, which can be corrected with a BCH[n=1023, k=323, l=70] code; and
the NAND ECC overhead for this implementation is 5441 flip-flops and 17413 LUT blocks (assuming a Xilinx Artix-7 FPGA).

In the case that the dedicated PUF ECC decoder is not deployed, the error correction capability of the NAND ECC decoder must be increased to t=81=70+11, which results in a BCH[n=1023, k=213, l=81] code being implemented. The overhead for this implementation is 6512 flip-flops and 20840 LUT blocks, which represents an additional hardware cost of around 19.7%. However, this approach can be used to improve reliability against the same data pattern issue since the unpredictability of the PUF response is circumvented.

Alternatively, a smaller PUF ECC engine can be deployed using a Reed-Solomon [n=1023, k=1002, t=11] code. This implementation requires an overhead of 624 flip-flops and 672 LUT blocks, which represents an additional hardware cost of less than 11%. However, this approach adds some latency overhead for the PUF noise correction.

In some embodiments, the scrambler can be implemented as a combination of the two approaches described above. For example, an even smaller PUF ECC decoder can be deployed and the error correction capability of the NAND ECC decoder can be marginally increased. This trade-off would typically depend on the specific NAND flash memory device.

The efficacy of the disclosed technology is further demonstrated by comparing its implementation in an FPGA (e.g., a Xilinx Artix-7 FPGA) to an AES implementation. As evidenced by the comparison in Table I, the proposed implementation is approximately five times more efficient in terms of hardware overhead than standard encryption techniques.

TABLE I

Hardware overhead comparison

| Method | FPGA blocks | |
|---|---|---|
| | Flip-flops | LUTs |
| Disclosed embodiments | 924 | 1172 |
| AES | 2872 | 5744 |

Figure 11:
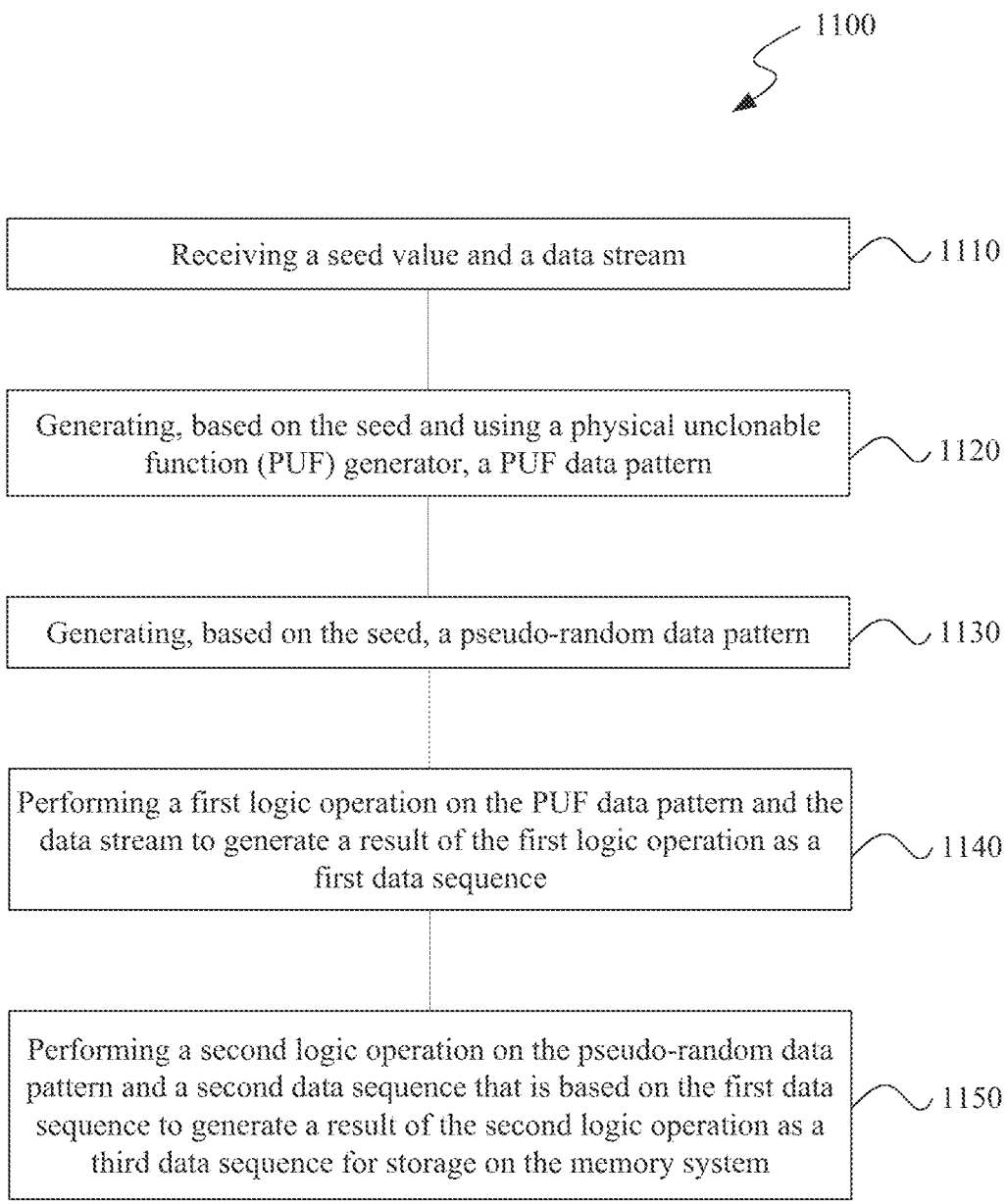
FIG. 11 illustrates a flowchart of an example method for improving reliability and security of a memory system.

FIG. 11 illustrates a flowchart of a method 1100 for improve the reliability and security of a memory system. The method 1100 includes, at operation 1110, receiving a seed value and a data stream.

The method 1100 includes, at operation 1120, generating, based on the seed and using a physical unclonable function (PUF) generator, a PUF data pattern.

The method 1100 includes, at operation 1130, generating, based on the seed, a pseudo-random data pattern.

The method 1100 includes, at operation 1140, performing a first logic operation on the PUF data pattern and the data stream to generate a result of the first logic operation as a first data sequence.

The method 1100 includes, at operation 1150, performing a second logic operation on the pseudo-random data pattern and a second data sequence that is based on the first data sequence to generate a result of the second logic operation as a third data sequence for storage on the memory system. In some embodiments, the PUF generator is selected at least in-part based on one or more physical characteristics of the memory system and increases the reliability and security for storage on the memory system.

In some embodiments, each of the first logic operation and the second logic operation comprises an XOR operation.

In some embodiments, the second data sequence is identical to the first data sequence.

In some embodiments, the method 1100 comprises the operation of performing an error correction encoding operation on the first data sequence to generate the second data sequence.

In some embodiments, the seed value is selected at least in-part based on a logical block address (LBA) or a physical page number (PPN) associated with the memory system.

In some embodiments, the one or more physical characteristics comprise threshold voltage differences in transistors in the memory system.

In some embodiments, the first error correction encoding operation comprises a Bose-Chaudhuri-Hocquenghem (BCH) encoding operation, and wherein the second error correction encoding operation comprises a Reed-Solomon encoding operation.

In some embodiments, the pseudo-random data pattern comprises a uniformly distributed sequence.

Figure 12:
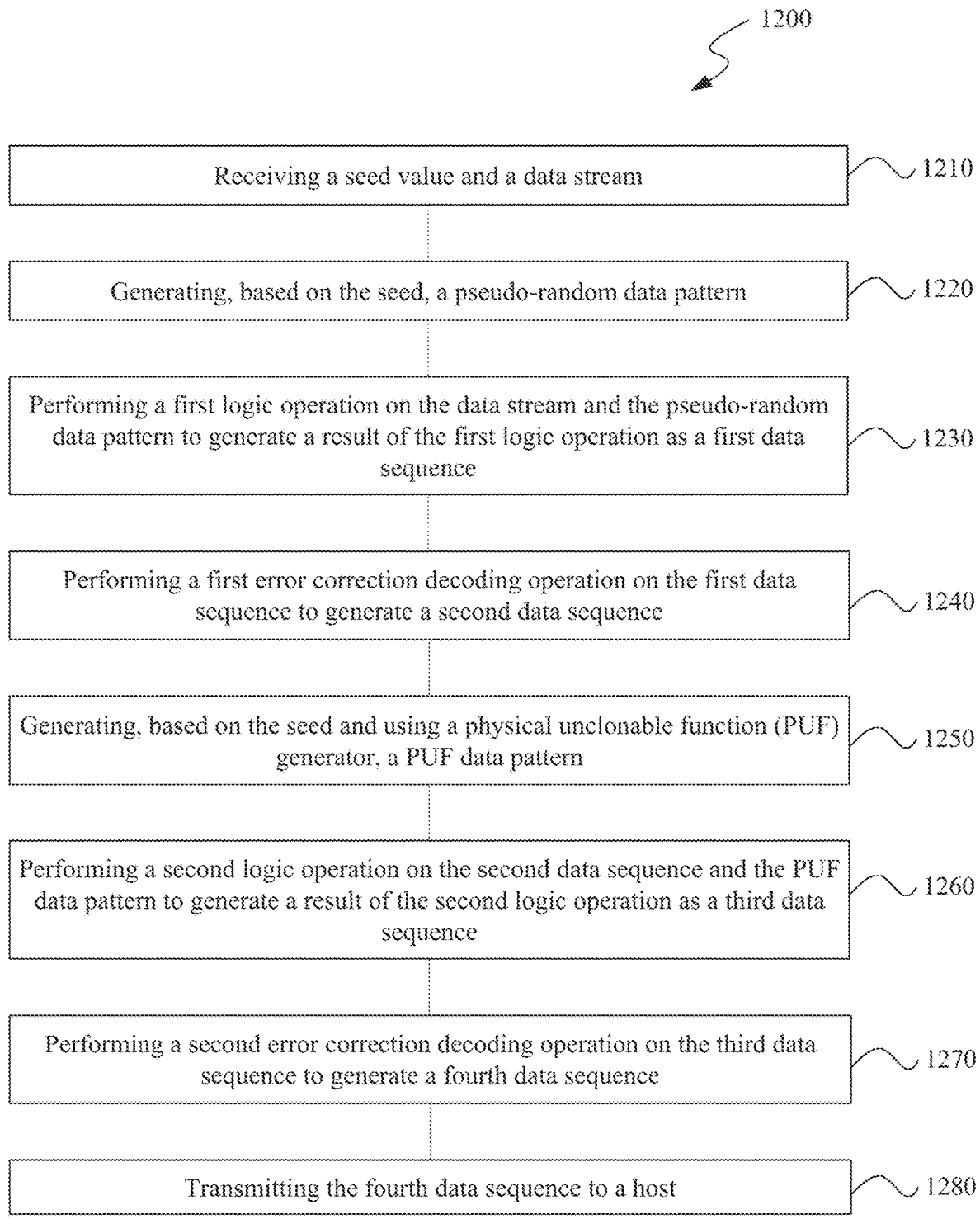
FIG. 12 illustrates a flowchart of another example method for improving reliability and security of a memory system.

FIG. 12 illustrates a flowchart of another method 1200 for improving the reliability and security of a memory system. The method 1200 includes, at operation 1210, receiving a seed value and a data stream.

The method 1200 includes, at operation 1220, generating, based on the seed, a pseudo-random data pattern.

The method 1200 includes, at operation 1230, performing a first logic operation on the data stream and the pseudo-random data pattern to generate a result of the first logic operation as a first data sequence.

The method 1200 includes, at operation 1240, performing a first error correction decoding operation on the first data sequence to generate a second data sequence.

The method 1200 includes, at operation 1250, generating, based on the seed and using a physical unclonable function (PUF) generator, a PUF data pattern.

The method 1200 includes, at operation 1260, performing a second logic operation on the second data sequence and the PUF data pattern to generate a result of the second logic operation as a third data sequence.

The method 1200 includes, at operation 1270, performing a second error correction decoding operation on the third data sequence to generate a fourth data sequence.

The method 1200 includes, at operation 1280, transmitting the fourth data sequence to a host. In some embodiments, the PUF generator is selected at least in-part based on one or more physical characteristics of the memory system and increases the reliability and security for storage on the memory system.

In some embodiments, each of the first logic operation and the second logic operation comprises an XOR operation.

In some embodiments, the second data sequence is identical to the first data sequence.

In some embodiments, the one or more physical characteristics comprise threshold voltage differences in transistors in the non-volatile memory.

Embodiments of the disclosed technology include a system for improving the reliability and security of a memory system is described. The system includes a physical unclonable function (PUF) generator to receive a seed value and output a PUF data pattern, a first logic circuit to receive a data stream, perform a first logic operation on the PUF data pattern and the data stream, and output a result of the first logic operation as a first data sequence, a pseudo-random number generator (PRNG) to receive the seed and generate a pseudo-random data pattern, and a second logic circuit to perform a second logic operation on the pseudo-random data pattern and a second data sequence that is based on the first data sequence, and output a result of the second logic operation as a third data sequence for storage on the memory system, wherein the PUF generator is selected at least in-part based on one or more physical characteristics of the memory system and increases the reliability and security for storage on the memory system.

Embodiments of the disclosed technology further include a non-transitory computer-readable storage medium having instructions stored thereupon for improving reliability and security of a memory system, comprising instructions for receiving a seed value and a data stream, instructions for generating, based on the seed and using a physical unclonable function (PUF) generator, a PUF data pattern, instructions for generating, based on the seed, a pseudo-random data pattern, instructions for performing a first logic operation on the PUF data pattern and the data stream to generate a result of the first logic operation as a first data sequence, and instructions for performing a second logic operation on the pseudo-random data pattern and a second data sequence that is based on the first data sequence to generate a result of the second logic operation as a third data sequence for storage on the memory system, wherein the PUF generator is selected at least in-part based on one or more physical characteristics of the memory system and increases the reliability and security for storage on the memory system.

Embodiments of the disclosed technology further include a non-transitory computer-readable storage medium having instructions stored thereupon for improving reliability and security of a memory system, comprising instructions for receiving a seed value, instructions for receiving a data stream read from the memory system, instructions for generating, based on the seed, a pseudo-random data pattern, instructions for performing a first logic operation on the data stream and the pseudo-random data pattern to generate a result of the first logic operation as a first data sequence, instructions for performing a first error correction decoding operation on the first data sequence to generate a second data sequence, instructions for generating, based on the seed and using a physical unclonable function (PUF) generator, a PUF data pattern, instructions for performing a second logic operation on the second data sequence and the PUF data pattern to generate a result of the second logic operation as a third data sequence, instructions for performing a second error correction decoding operation on the third data sequence to generate a fourth data sequence, and instructions for transmitting the fourth data sequence to a host, wherein the PUF generator is selected at least in-part based on one or more physical characteristics of the memory system and increases the reliability and security for storage on the memory system.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for improving reliability and security of storage or retrieval of information to and from a memory system, comprising:
   a physical unclonable function (PUF) generator to receive a seed value and output a PUF data pattern;
   a first logic circuit to receive a data stream, perform a first logic operation on the PUF data pattern and the data stream, and output a result of the first logic operation as a first data sequence;
   a pseudo-random number generator (PRNG) to receive the seed and generate a pseudo-random data pattern; and
   a second logic circuit to perform a second logic operation on the pseudo-random data pattern and a second data sequence that is based on the first data sequence, and output a result of the second logic operation as a third data sequence for storage on the memory system,
   wherein the PUF generator is selected at least in-part based on one or more physical characteristics of the memory system and wherein the one or more physical characteristics comprise threshold voltage differences between at least two memory cell transistors in the memory system.

2. The system of claim 1, wherein each of the first logic operation and the second logic operation comprises an XOR operation.

3. The system of claim 1, wherein the second data sequence is identical to the first data sequence.

4. The system of claim 1, further comprising:
   a first error-correcting code (ECC) encoder to receive the first data sequence and perform a first error correction encoding operation thereon to generate the second data sequence.

5. The system of claim 4, further comprising:
   a second ECC encoder to receive an input and perform a second error correction encoding operation thereon to generate the data stream.

6. The system of claim 5, wherein the first error correction encoding operation comprises a Bose-Chaudhuri-Hocquenghem (BCH) encoding operation, and wherein the second error correction encoding operation comprises a Reed-Solomon encoding operation.

7. The system of claim 1, wherein the seed value is selected at least in-part based on a logical block address (LBA) or a physical page number (PPN) associated with the memory system.

8. The system of claim 1, wherein the pseudo-random data pattern comprises a uniformly distributed sequence.

9. A method for improving reliability and security of storage or retrieval of information to and from a memory system, comprising:
   receiving a seed value and a data stream;
   generating, based on the seed and using a physical unclonable function (PUF) generator, a PUF data pattern;
   generating, based on the seed, a pseudo-random data pattern;
   performing a first logic operation on the PUF data pattern and the data stream to generate a result of the first logic operation as a first data sequence; and
   performing a second logic operation on the pseudo-random data pattern and a second data sequence that is based on the first data sequence to generate a result of the second logic operation as a third data sequence for storage on the memory system,
   wherein the PUF generator is selected at least in-part based on one or more physical characteristics of the memory system and wherein the one or more physical characteristics comprise threshold voltage differences between at least two memory cell transistors in the memory system.

10. The method of claim 9, wherein each of the first logic operation and the second logic operation comprises an XOR operation.

11. The method of claim 9, wherein the second data sequence is identical to the first data sequence.

12. The method of claim 9, further comprising:
   performing an error correction encoding operation on the first data sequence to generate the second data sequence.

13. The method of claim 9, wherein the seed value is selected at least in-part based on a logical block address (LBA) or a physical page number (PPN) associated with the memory system.

14. A non-transitory computer-readable storage medium having instructions stored thereupon for improving reliability and security of a memory system, the instructions when executed by a data processing apparatus, cause the data processing apparatus to perform operations comprising:
receiving a seed value;
receiving a data stream read from the memory system;
generating, based on the seed, a pseudo-random data pattern;
performing a first logic operation on the data stream and the pseudo-random data pattern to generate a result of the first logic operation as a first data sequence;
performing a first error correction decoding operation on the first data sequence to generate a second data sequence;
generating, based on the seed and using a physical unclonable function (PUF) generator, a PUF data pattern;
performing a second logic operation on the second data sequence and the PUF data pattern to generate a result of the second logic operation as a third data sequence;
performing a second error correction decoding operation on the third data sequence to generate a fourth data sequence; and
transmitting the fourth data sequence to a host,
wherein the PUF generator is selected at least in-part based on one or more physical characteristics of the memory system and wherein the one or more physical characteristics comprise threshold voltage differences between at least two memory cell transistors in the memory system.

15. The storage medium of claim 14, wherein each of the first logic operation and the second logic operation comprises an XOR operation.

16. The storage medium of claim 14, wherein the first error correction decoding operation comprises a Bose-Chaudhuri-Hocquenghem (BCH) decoding operation, and wherein the second error correction decoding operation comprises a Reed-Solomon decoding operation.

17. A method for improving reliability and security of storage or retrieval of information to and from a memory system, comprising:
receiving a seed value;
receiving a data stream read from the memory system;
generating, based on the seed, a pseudo-random data pattern;
performing a first logic operation on the data stream and the pseudo-random data pattern to generate a result of the first logic operation as a first data sequence;
generating, based on the seed and using a physical unclonable function (PUF) generator, a PUF data pattern;
performing a second logic operation on the first data sequence and the PUF data pattern to generate a result of the second logic operation as a second data sequence; and
transmitting the second data sequence to a host,
wherein the PUF generator is selected at least in-part based on one or more physical characteristics of the memory system and wherein the one or more physical characteristics comprise threshold voltage differences between at least two memory cell transistors in the memory system.

* * * * *